W. MAUSS.
MIXING LIQUIDS OR SEMILIQUIDS.
APPLICATION FILED MAR. 23, 1921.
1,438,843.
Patented Dec. 12, 1922.
Fig. I
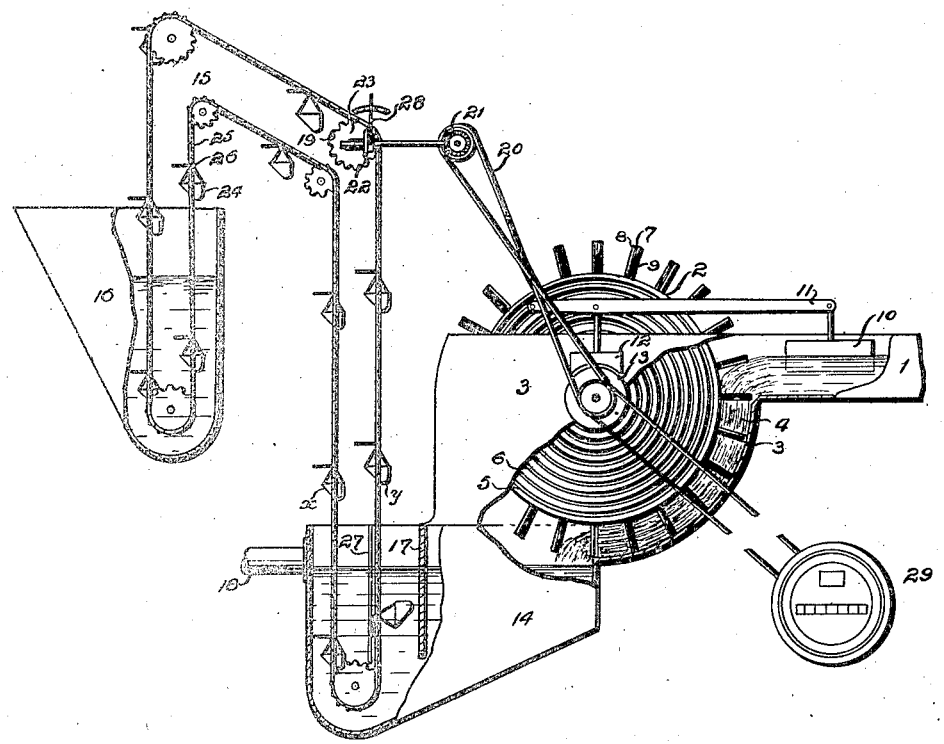
Fig. II
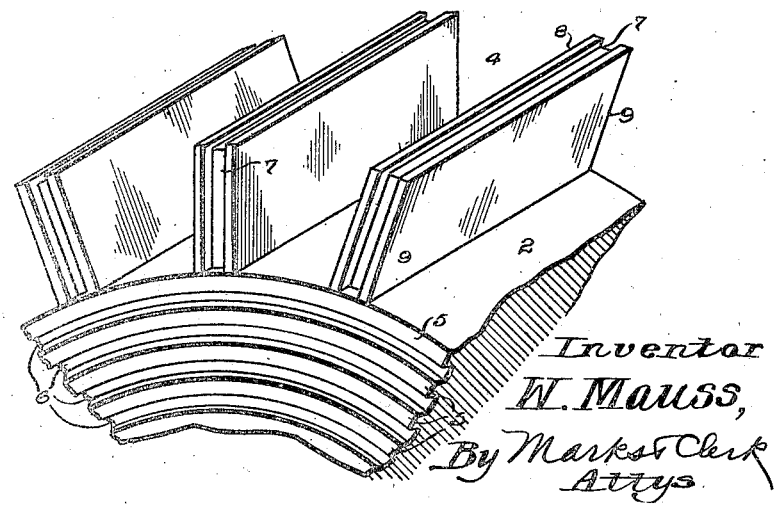
Inventor
W. Mauss,
By Marks & Clerk
Attys Patented Dec. 12, 1922.

1,438,843

UNITED STATES PATENT OFFICE.

WILHELM MAUSS, OF JOHANNESBURG, TRANSVAAL, SOUTH AFRICA, ASSIGNOR TO CONTINUOUS CENTRIFUGALS LIMITED, OF JOHANNESBURG, TRANSVAAL PROVINCE OF THE UNION OF SOUTH AFRICA.

MIXING LIQUIDS OR SEMILIQUIDS.

Application filed March 23, 1921. Serial No. 454,955.

*To all whom it may concern:*

Be it known that WILHELM MAUSS, a British subject, residing at 72, Cullinan Buildings, Simmonds Street, Johannesburg, Transvaal Province of the Union of South Africa, has invented certain new and useful Improvements in Mixing Liquids or Semiliquids, of which the following is a specification.

The present invention has reference to adding one liquid or semi-liquid to another in definite proportions; and in the particular embodiment hereafter described it is applied to the liming of sugar juice for continually adding a small proportion of lime in admixture with water to a stream of juice.

The purpose of the invention is to enable the proportions of the two liquids to be maintained constant irrespective of variation of the volume of the liquids treated. Another object is to enable the proportion to be readily varied if desired. Another object is to provide an apparatus specially adapted for adding, with exactness, a very small proportion of one liquid to a large proportion of the other.

The invention is illustrated in the accompanying drawings in which

Fig. I shows the general arrangement, and

Fig. II is an enlarged detail view of one of the vanes of the bucket wheel.

1 indicates a launder delivering sulphured sugar juice. At the end of said launder is an undershot bucket wheel 2 which is turned by the juice flowing from the launder.

The invention aims to make the revolutions of the wheel 2 closely proportional to the flow of juice, and with that object means are provided to prevent leakage between the wheel and its casing 3 and also to ensure that the buckets 4 are always full.

The drawing shows the end surfaces of the nave 5 formed for this purpose with annular packing grooves 6, which in the well known manner inhibit the flow of liquid between themselves, and the adjacent surfaces of the casing 3. Similarly longitudinal packing grooves 7 are formed on the edges 8 and 9 of the blades.

To ensure the buckets being filled there is provided in the launder 1 a float 10. Said float is attached to a lever 11 carrying a brake block 12 which cooperates with a brake drum 13 fast with the wheel 2. Before the juice in the launder falls to such a level as would cause the buckets 4 of the wheel not to fill completely, the brake comes into operation and holds the wheel from revolving until the flow of juice raises the level in the launder 1 to the proper point.

From the bucket wheel the juice is delivered to the box 14 wherein the lime is added to it. A bucket conveyor 15 delivers the water and lime mixture from a storage tank 16. Said conveyor dips to the bottom of the tank 16 so as to keep the mixture therein well agitated, and also extends considerably below the surface of the sugar juice in the box 14 with the double object of effectively mingling the lime water with the juice and of washing the buckets in the juice to keep them clear of lime deposit which would tend to upset the balance of the conveyor, such balance being of importance for the reason stated hereafter. The part of the box into which the conveyor 15 dips, is shut off from the main portion of the box by a baffle 17 so that the limed juice does not again mingle with the untreated juice. The limed juice passes away by the outlet 18.

The bucket wheel 2 and the sprocket 19 of the conveyor are connected for uniform movement by mechanism including the belt 20, bevel gear 21, the friction wheel 22 and the friction disc 23 fast with the sprocket 19 and in driving engagement with the friction wheel 22. It is desirable not to impose any substantial work on the bucket wheel 2 in order that the head above it may be kept low and leakage past it and friction minimized. Consequently the lime supply tank 16 is raised and the conveyor 15 is arranged substantially to drive itself by the preponderance of the weight of the descending full buckets *x* over the empty ascending buckets *y*; the connections 20, 21, 22 and 23 serving thus simply to maintain uniformity between the motions of the bucket wheel and the conveyor.

The conveyor buckets 24 are jointed to the chain 25 at 26 so that they can tilt freely thereon. They are so weighted that normally they assume and maintain the carrying position as indicated at *x*. As they leave the bottom of the liming box 14 they meet a ramp 27 which tilts them to discharge their lime contents and maintains them tilted until they emerge from the sugar juice.

The friction wheel 22 is adjustable radially of the friction disc 23 by mechanism 28 in order to vary the relative speed of the bucket wheel and the conveyor. By this means the proportion of lime to sugar juice may be readily altered as required whilst the apparatus is working.

Advantage is taken of the fact that the revolutions of the bucket wheel closely correspond to the volume of juice treated by connecting to said wheel a device 29 which indicates the momentary rate of flow and also totals the amount of liquid passed.

I claim:

1. Apparatus for adding one liquid or semi-liquid to another comprising a bucket wheel, a launder feeding the same, a float in the launder, brake mechanism controlled by the level of the liquid or semi-liquid in the launder and governing the bucket wheel, a conveyor for feeding the other liquid or semi-liquid geared with the bucket wheel to move together therewith, said bucket wheel and conveyor being arranged to commingle the liquids or semi-liquids.

2. Apparatus for adding one liquid or semi-liquid to another comprising a bucket wheel actuated by one liquid or semi-liquid, an endless conveyor geared to the bucket wheel to move therewith, a common vessel into which the bucket wheel and conveyor discharge, a tank for supplying the second liquid or semi-liquid to the conveyor for transportation to the vessel, said tank being so raised with regard to the vessel as to make the conveyor substantially self propelling.

3. Apparatus for adding one liquid or semi-liquid to another comprising a bucket wheel actuated by one liquid or semi-liquid, a conveyor for feeding the other liquid or semi-liquid and variable speed mechanism connecting the bucket wheel and the conveyor, said bucket wheel and conveyor being arranged to commingle the liquids or semi-liquids.

In testimony whereof I affix my signature.

WILHELM MAUSS.